(12) United States Patent
Silva

(10) Patent No.: US 8,333,887 B2
(45) Date of Patent: Dec. 18, 2012

(54) METHODS AND SYSTEMS FOR PURIFYING AQUEOUS LIQUIDS

(75) Inventor: James Manio Silva, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 551 days.

(21) Appl. No.: 12/256,918

(22) Filed: Oct. 23, 2008

(65) Prior Publication Data

US 2010/0102009 A1  Apr. 29, 2010

(51) Int. Cl.
    *C02F 1/46* (2006.01)
(52) U.S. Cl. .......... 210/195.1; 210/243; 210/202; 210/748.01; 210/748.12; 210/748.16; 204/554; 204/660; 204/242; 204/627
(58) Field of Classification Search .......... 210/748.01, 210/243, 195.1, 748.12, 748.16, 767, 702, 210/633, 634, 712, 713, 256, 195.3, 738, 210/87, 143, 615, 151, 641, 650; 205/687; 422/22; 204/627, 660, 554, 267, 269, 228.3
See application file for complete search history.

(56) References Cited

U.S. PATENT DOCUMENTS

| | | | |
|---|---|---|---|
| 5,779,891 A | | 7/1998 | Andelman |
| 5,954,937 A | * | 9/1999 | Farmer ............... 205/687 |
| 6,309,532 B1 | | 10/2001 | Tran et al. |
| 6,795,298 B2 | * | 9/2004 | Shiue et al. ........... 361/508 |
| 2002/0154469 A1 | | 10/2002 | Shiue et al. |
| 2003/0098266 A1 | | 5/2003 | Shiue et al. |
| 2004/0130851 A1 | | 7/2004 | Faris |
| 2005/0103634 A1 | | 5/2005 | Andelman et al. |
| 2006/0060532 A1 | * | 3/2006 | Davis ................... 210/652 |
| 2008/0035548 A1 | | 2/2008 | Fan |
| 2008/0169098 A1 | | 7/2008 | Christopher et al. |
| 2008/0185346 A1 | * | 8/2008 | Xiong et al. ............ 210/748 |

FOREIGN PATENT DOCUMENTS

| | | |
|---|---|---|
| EP | 1348670 A1 | 10/2003 |
| WO | 2007070594 A2 | 6/2007 |
| WO | WO2007070594 A2 | 6/2007 |

(Continued)

OTHER PUBLICATIONS

Bostjancic et al., "Getting to Zero Discharge: How to Recycle That Last Bit of Really Bad Wastewater", Ionics, Incorporated, Ionics Technical Paper, 57th Annual International Water Conference, Bellevue, Washington, pp. 1-7, Oct. 21-23, 1996.

(Continued)

*Primary Examiner* — Joseph Drodge
*Assistant Examiner* — Cameron J Allen
(74) *Attorney, Agent, or Firm* — Mary Louise Stanford

(57) ABSTRACT

Methods and systems are provided for the efficient purification of aqueous liquids comprising an ionic solute. The liquids are purified by a plurality supercapacitor desalination units working in tandem; a first unit operating in "charge" mode, deionizing the feed solution and producing a purified product liquid, while a second supercapacitor desalination unit is operated in "discharge" mode, releasing ions into a circulating stream and producing a concentrate. The output of the first desalination unit is removed as a purified product stream. The output of the second desalination unit is a concentrate, which is directed to a common precipitation unit where a portion of the ionic solute is precipitated and separated from the remaining liquid phase, which may be recirculated to the second desalination unit. The use of two supercapacitor desalination units operating out of phase allows the common precipitation unit to be operated continuously under steady state conditions.

6 Claims, 6 Drawing Sheets

FOREIGN PATENT DOCUMENTS

WO WO2007087274 A1 8/2007

OTHER PUBLICATIONS

Welgemoed at el., "Capacitive Deionization Technology™: An Alternative Desalination Solution", Desalination, vol. 183, pp. 327-340, May 2005.

U.S. Appl. No. 11/670,232, filed Feb. 1, 2007, entitled "Liquid Management Method and System".

Oren et al., Capacitive deionization (CDI) for desalination and water treatment—past, present and future (a review), Desalination, Received Feb. 16, 2007, Accepted Aug. 1, 2007, Published Aug. 15, 2008 pp. 10-29, vol. 228, Elsevier, Amsterdam, NL.

International Seach Report issued in connection with corresponding PCT Application No. PCT/US2009/061115 on Dec. 21, 2009.

\* cited by examiner

METHODS AND SYSTEMS FOR PURIFYING AQUEOUS LIQUIDS

TECHNICAL FIELD

Embodiments of this invention relate to the field of purification of aqueous liquids and in particular the desalination of aqueous liquids. Embodiments of this invention relate to a desalination device and a method of using the desalination device.

DISCUSSION OF RELATED ART

Less than one percent of water on the earth's surface is suitable for direct consumption in domestic or industrial applications. With limited sources of natural drinking water, de-ionization of seawater or brackish water, commonly known as desalination, is a way to produce fresh water. There are a number of desalination techniques that are currently employed to de-ionize or desalt a water source.

Capacitive deionization is an electrostatic process that operates at a low voltage (about 1 volt) and low pressure (15 psig). When saline water is pumped through a high-surface-area electrode assembly, ions in the water, such as dissolved salts, metals, and some organics, are attracted to oppositely charged electrodes. This concentrates the ions at the electrodes and reduces the concentration of the ions in the water. When the electrode capacity is exhausted, the saline feed water flow is stopped, and the capacitor is discharged, optionally into a separate, more concentrated solution. This cycle is then repeated.

It may be desirable to have a device or system for desalination that differs from those devices or systems that are currently available. It may be desirable to have a method of making or using a device or system for desalination that differs from those methods that are currently available.

BRIEF DESCRIPTION

In one embodiment, the present invention provides a method of purifying an aqueous liquid, said method comprising introducing an aqueous feed solution comprising an ionic solute into a first supercapacitor desalination unit while simultaneously discharging a concentrate from a second supercapacitor desalination unit (concentrate B), and introducing concentrate B into a common precipitation unit; and thereafter introducing the aqueous feed solution into the second supercapacitor desalination unit while simultaneously discharging a concentrate from the first supercapacitor desalination unit (concentrate A) and introducing concentrate A into the common precipitation unit; and recovering a purified liquid and a precipitate.

In another embodiment, the present invention provides a method of seawater desalination, said method comprising introducing seawater into a first supercapacitor desalination unit while simultaneously discharging a concentrate from a second supercapacitor desalination unit (concentrate B) and introducing concentrate B into a common precipitation unit; and thereafter introducing seawater into the second supercapacitor desalination unit while simultaneously discharging a concentrate from the first supercapacitor desalination unit (concentrate A) and introducing concentrate A into the common precipitation unit; recovering purified water; and optionally recovering a salt precipitate.

In yet another embodiment, the present invention provides a method of purifying an aqueous liquid, said method comprising introducing an aqueous feed solution comprising an ionic solute into a first supercapacitor desalination unit while simultaneously discharging a concentrate from a second supercapacitor desalination unit (concentrate B) and introducing concentrate B into a common precipitation unit; and thereafter introducing the aqueous feed solution into the second supercapacitor desalination unit while simultaneously discharging a concentrate from the first supercapacitor desalination unit (concentrate A) and introducing concentrate A into a common precipitation unit; and recovering a purified liquid and a precipitate; wherein said first and second supercapacitor desalination units each comprise at least one pair of oppositely charged surfaces, said method being characterized by a residence time in the common precipitation unit of concentrates A or B in a range from about 5 minutes to about 4 hours, said method being characterized by a charge time and a discharge time which are substantially the same and are in a range from about 5 minutes to about 4 hours, said method being characterized by a potential drop of about 1 volt across said pair of alternating charged surfaces, said method being characterized by at least one of the supercapacitor desalination units being discharged through an energy recovery device.

In still yet another embodiment, the present invention provides a zero liquid discharge water purification system comprising (a) a first supercapacitor desalination unit; (b) a second supercapacitor desalination unit; (c) a common precipitation unit; (d) a first fluid input line and a second fluid input line; (e) a first fluid discharge line and a second fluid discharge line; (f) a product output line; and (g) a fluid return loop; wherein the first and second supercapacitor desalination units can be alternately and mutually exclusively connected to either the product output line, or the common precipitation unit.

These and other features, aspects, and advantages of the present invention may be understood more readily by reference to the following detailed description.

BRIEF DESCRIPTION OF THE DRAWING FIGURES

Like numbers represent substantially the same parts from figure to figure.

DETAILED DESCRIPTION

Figure 1:
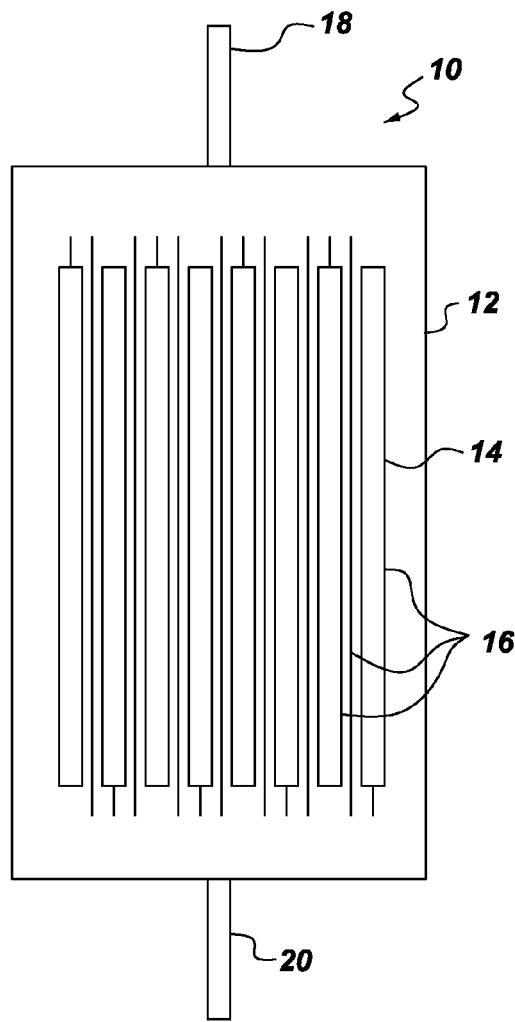
FIG. 1 is a schematic diagram of a supercapacitor desalination unit device.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted in one embodiment, the present invention provides a method of purifying an aqueous liquid, the method comprising introducing an aqueous feed solution comprising an ionic solute into a first supercapacitor desalination unit while simultaneously discharging a concentrate from a second supercapacitor desalination unit (concentrate B) and introducing concentrate B into a common precipitation unit; and thereafter introducing the aqueous feed solution into the second supercapacitor desalination unit while simultaneously discharging a concentrate from the first supercapacitor desalination unit (concentrate A) and introducing concentrate A into the common precipitation unit; and recovering a purified liquid and a precipitate.

Aqueous liquids comprising one or more ionic solutes which may be purified according to the method provided by the present invention are illustrated by seawater, brackish water, cooling tower blowdown water, chemical process wastewater streams, brine, lake water, river water, reservoir water and combinations thereof. Because of its relative abundance, seawater is a particularly important feed solution which may be purified according to the method of the present invention. In one embodiment, brackish water may serve as the feed solution to be purified. In one embodiment, the aqueous solution comprises an organic ionic solute, for example a quaternary ammonium salt. As used herein, the term saline water refers broadly to an aqueous solution containing one or more ionic solutes. Typically, the ionic solutes present in saline water are inorganic salts such as sodium chloride, sodium bromide, sodium carbonate, sodium sulfate, calcium chloride, lithium fluoride, and the like.

In various embodiments of the present invention an aqueous feed solution comprising an ionic solute is purified by means of two or more supercapacitor desalination units working in tandem; a first supercapacitor desalination unit operating in "charge" mode ("charging") and producing a purified product liquid, while a second supercapacitor desalination unit is operated in "discharge" mode ("discharging") and producing a concentrate. The output of the first supercapacitor desalination unit (a purified product liquid) is removed from the system as a purified product stream. The output of the second supercapacitor desalination unit is a concentrate, which is directed to a common precipitation unit where a portion of the ionic solute is precipitated and separated from the remaining liquid phase which is circulated back to the second supercapacitor desalination unit operating in "discharge" mode. Those skilled in the art will appreciate that, apart from liquid adhering to or contained within the precipitate, the system described in this paragraph and like embodiments throughout this disclosure are capable of zero liquid discharge and may be at times herein referred to as a zero liquid discharge water purification systems.

As will be detailed below, a supercapacitor desalination unit in "charge" mode may be operated in "charge" mode until its capacity for useful retention of ionic solute is exceeded, and thereafter, the supercapacitor desalination unit is operated in "discharge" mode in which retained ionic solute is released from the supercapacitor desalination unit. Conventional zero liquid discharge water purification systems employ a single supercapacitor desalination unit and a single precipitation unit. As a result, while the supercapacitor desalination unit is in "charge" mode, the precipitation unit does not receive concentrate. Because the times required to fully "charge" and "discharge" the supercapacitor desalination unit are roughly equal, the precipitation unit in a conventional zero liquid discharge water purification system is underutilized and is not operated under steady state conditions. An important advantage of the methods and systems provided by the present invention is that supply of concentrate to the common precipitation unit is uninterrupted and the common precipitation unit can be operated under steady state conditions or conditions closely approximating a steady state, thereby enhancing the efficient operation of the common precipitation unit.

In one embodiment, the method and system of the present invention may be employed for desalination of seawater or de-ionization of other brackish waters to reduce the amount of salt to a permissible level for domestic and industrial use.

In order that the present invention and its advantages may be better understood, certain basic principles of supercapacitor desalination units are presented briefly herein. Thus, a supercapacitor is an electrochemical capacitor that has a relatively higher energy density when compared to a conventional capacitor. As used herein, supercapacitor is inclusive of other high performance capacitors, such as ultracapacitors. A capacitor is an electrical device that can store energy in the electric field between a pair of closely spaced conductors (called 'plates'). When voltage is applied to the capacitor, electric charges of equal magnitude, but opposite polarity, build up on each plate.

Referring to FIG. 1, the figure represents is a diagrammatic view of an exemplary supercapacitor desalination unit (also called a device) 10 having a controller (not shown) and employing a housing 12. The housing has an inner surface that defines a volume. Within the volume the housing contains a supercapacitor desalination stack 14. The desalination stack includes a plurality of supercapacitor desalination cells 16. Each of the plurality of cells 16 includes a pair of electrodes, an insulating spacer and a pair of current collectors. Further, the housing includes at least one inlet 18 through which a feed liquid enters the supercapacitor desalination unit, and an outlet 20 from which the liquid exits the supercapacitor desalination unit after contact with the supercapacitor desalination cells. Movement of the feed liquid through the supercapacitor desalination unit may be facilitated by various means, such as gravity, suction, and pumping.

Still referring to FIG. 1, when a feed liquid (not shown) entering the supercapacitor desalination unit operating in "charge" mode via feed inlet 18 is a saline solution, for example seawater, the salinity of the product liquid exiting the supercapacitor desalination unit through fluid outlet 20 will be lower than the salinity of the feed liquid. In contrast, when the supercapacitor desalination unit is being operated in "discharge" mode, the salinity of the fluid exiting the supercapacitor desalination unit through fluid outlet 20 will typically be greater than the salinity of the feed liquid. As noted, the supercapacitor desalination unit comprises a controller, and the controller provides for control of the potential drop across the electrodes of the individual supercapacitor desalination cells 16. In addition, the controller may communicate with and control appropriate valves, sensors, switches and the like, such that the mode of operation can reversibly switch from a "charge" mode to a "discharge" mode in response to defined criteria. Such criteria can include elapsed time, concentration of ionic solute, conductivity, resistivity, and the like.

Still referring to FIG. 1, in "charge" mode, the residence time of the feed liquid within the supercapacitor desalination unit stack 14 may be controlled in order to achieve a particular level of salinity in the product fluid exiting fluid outlet 20. That is, more or less time may be required to de-ionize the feed liquid to a defined level of charged species as measured by an appropriately located sensor in communication with the controller. In certain embodiments, a plurality of such cells may be arranged within the supercapacitor desalination unit such that the output of a first cell may be treated as a feed liquid for a second cell.

Figure 2:
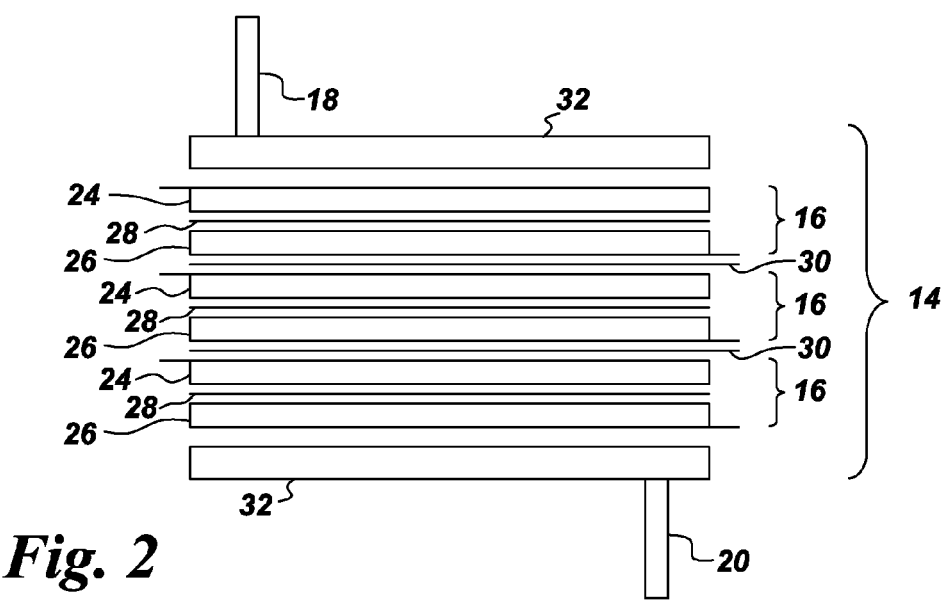
FIG. 2 is an alternate supercapacitor desalination unit device.

Referring to FIG. 2, the figure represents a supercapacitor desalination stack 14 supported by support plates 32, comprising a plurality of supercapacitor desalination cells 16, said cells comprising electrodes 24 and 26 separated by insulating spacers 28. The supercapacitor desalination stack optionally comprises a current collector 30. Current collectors 30 may be used to recover electrical energy stored in the supercapacitor desalination unit during "charging" and released during "discharging" of the supercapacitor desalination unit.

Figure 3:
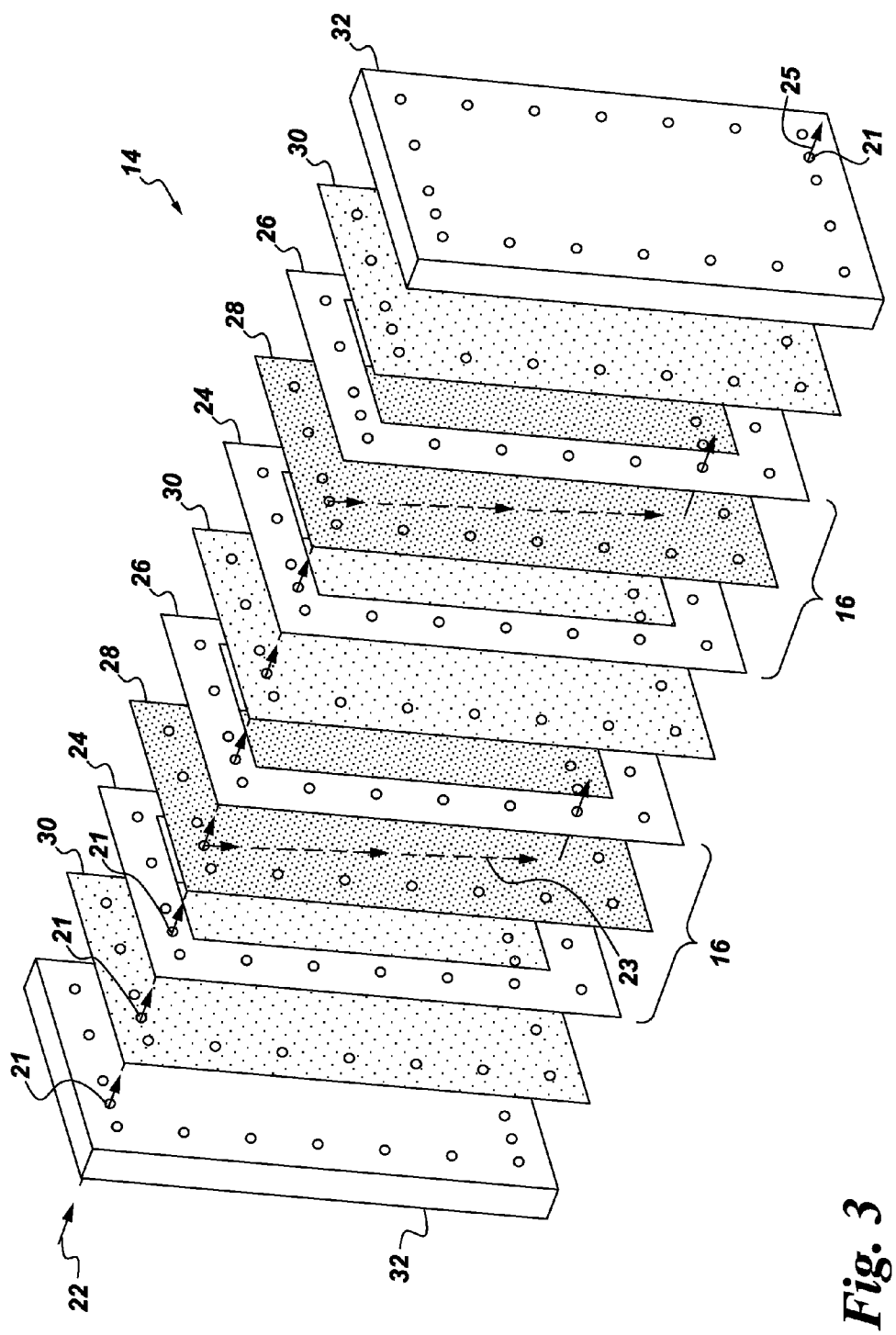
FIG. 3 is an exploded perspective diagram of a portion of the stack of FIG. 1.

Referring to FIG. 3, the figure represents supercapacitor desalination stack 14 in greater detail relative to FIG. 1 and FIG. 2. The figure illustrates a supercapacitor desalination stack 14 comprising support plates 32 and supercapacitor desalination cells 16 and current collectors 30 disposed between said cells 16. Supercapacitor desalination cells 16 comprise electrodes 24 and 26 and insulating spacers 28. The figure also illustrates the use of holes or apertures 21 through which a liquid may flow while present within the supercapacitor desalination unit comprising stack 14. For example, a fluid may be introduced into stack 14 as indicated by directional arrow 22 through aperture 21, flow through at least a portion of the stack as indicated by directional arrow 23, and exit the stack as indicated by directional arrow 25.

Figure 4:
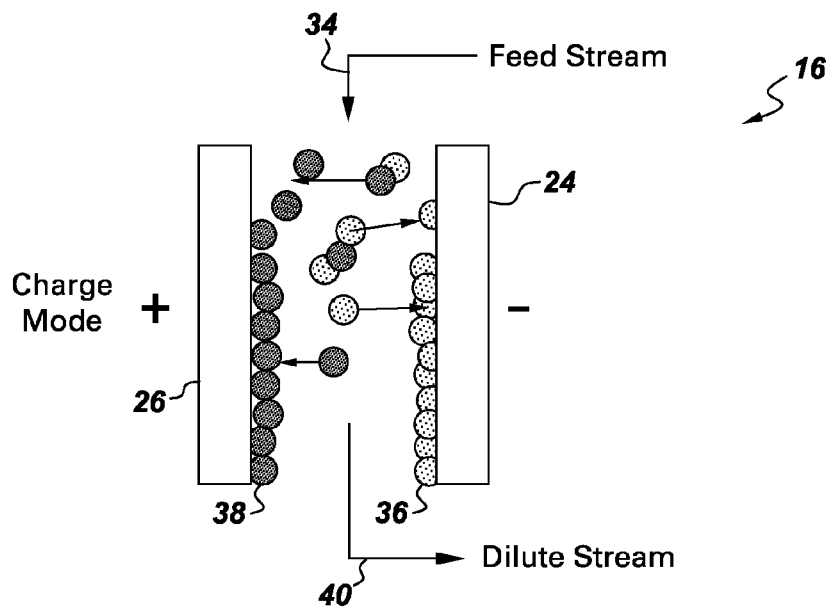
FIG. 4 is a perspective diagram of a supercapacitor desalination cell during a charging mode of operation according to certain embodiments of the invention.

Referring to FIG. 4, the figure represents a supercapacitor desalination cell (insulating spacer not shown) 16 during "charging" of the supercapacitor desalination unit. Thus a feed stream 34 comprising an ionic solute comprising cations 36 and anions 38 is introduced into the cell. The oppositely charged electrodes 24 and 26 attract and retain ions of opposite charge from the feed stream as it passes through the cell. The product fluid leaving the supercapacitor desalination cell contains less of the ionic solute than the feed stream and is referred to in the figure as the "Dilute Stream" 40 which represents a purified liquid. Typically, the electrodes 24 and 26 define a potential difference between about 1 and about 2 volts (direct current). The ionic solute will be adsorbed at the oppositely charged electrodes 24 and 26 until the surfaces are saturated at which point the feed stream will pass through the cell without any change in the concentration of ionic solute. In various embodiments of the present invention, the electrodes of the supercapacitor desalination cells of the supercapacitor desalination unit may at times herein be referred to as "oppositely charged surfaces".

Figure 5:
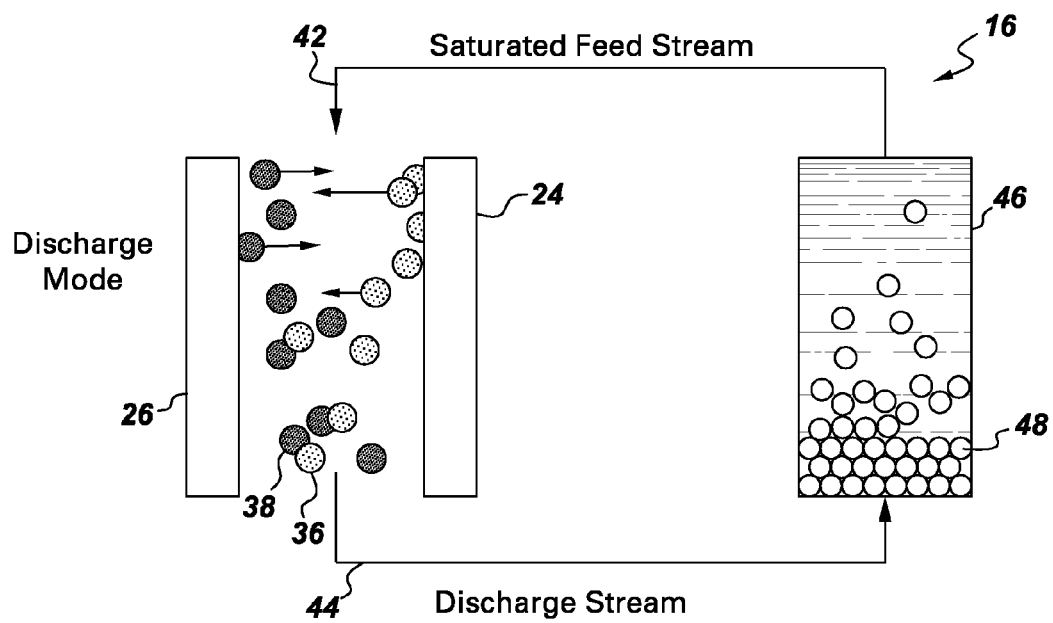
FIG. 5 is a perspective view of a supercapacitor desalination cell during a discharging mode of operation according to certain embodiments of the invention.

Referring to FIG. 5, the figure represents a supercapacitor desalination cell 16 during the discharge mode of the supercapacitor desalination unit. During the discharge mode of the supercapacitor desalination cell, the electrodes 24 and 26 are short-circuited (or discharged under controlled conditions through a load to recover stored energy) and the cations 36 and anions 38 are released from the surfaces of electrodes 24 and 26. In this example, the fluid entering the cell during the discharge mode is a saturated or supersaturated stream of ionic solute. This fluid 42 leaves the precipitation unit 46. The fluid exiting the cell during the discharge mode (referred to as the "Discharge Stream" 44 in the figure) represents a supersaturated solution of the ionic solute. The discharge stream is transferred to a precipitation unit 46 where some of the ionic solute separates from the discharge stream as a solid precipitate 48. The fluid in the precipitation unit after precipitation of the ionic solid remains saturated or supersaturated with the ionic solute. This stream is less concentrated than discharge stream 44 because of the precipitation of ionic species in the precipitation unit 46. This fluid (referred to as the "Saturated Feed Stream" 42 in the figure) is re-circulated through the cell to aid in the removal of cations 36 and anions 38 from the cell. Thus, the products of the supercapacitor desalination cell during discharging are the solid precipitate 48 and a saturated feed stream 42. Solid precipitate, which may be wet with fluid comprising ionic solute, may be periodically or continuously discharged from the precipitation unit.

Figure 6A:
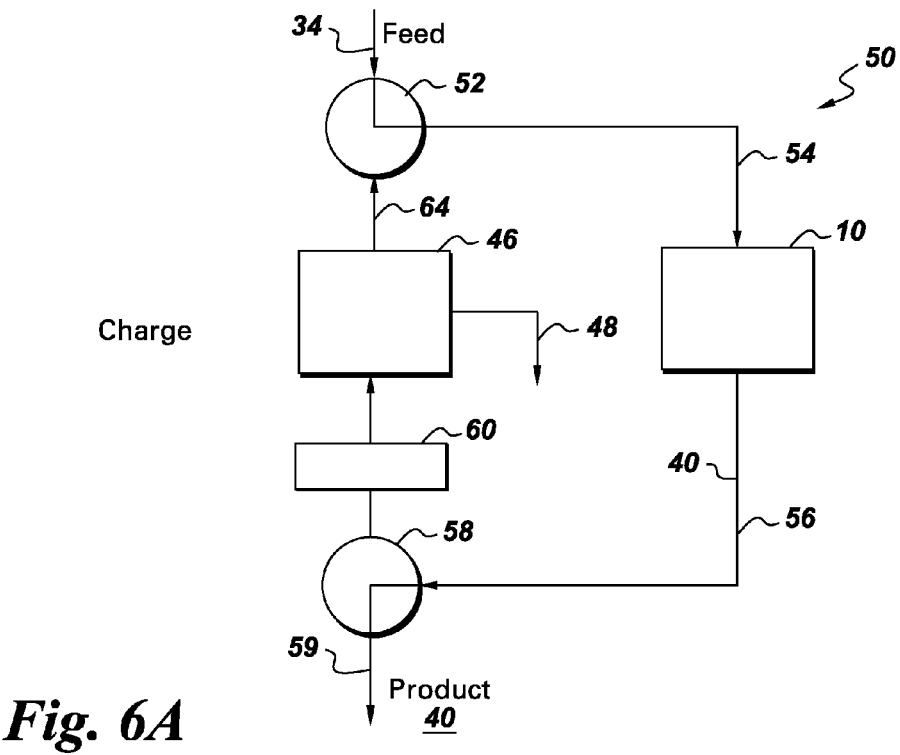
FIG. 6 is a block diagram of a zero liquid discharge water purification system during charging and discharging modes of operation.
Figure 6B:
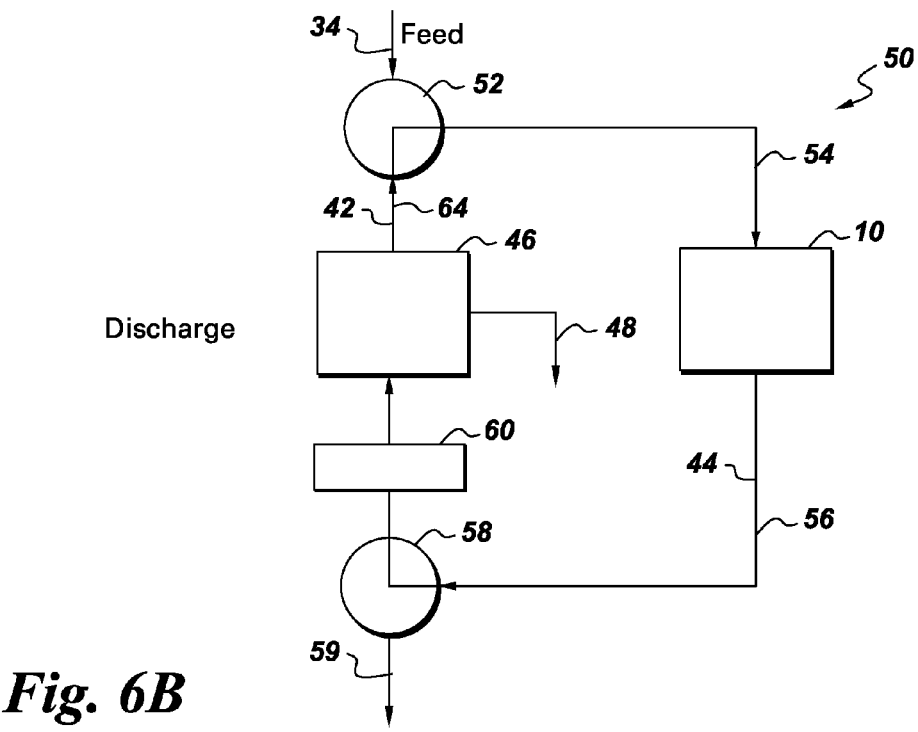

Referring to FIG. 6, the figure represents a conventional zero liquid discharge water purification system 50 comprising a supercapacitor desalination unit 10 and a precipitation unit 46 being operated alternately in "charge" mode and "discharge" mode. During "charge" mode, an aqueous feed stream 34 comprising an ionic solute is introduced into the system via valve 52 and along fluid input line 54 to supercapacitor desalination unit 10. In "charge" mode the fluid 40 exiting the supercapacitor desalination unit 10 is a purified liquid which is conducted along fluid discharge line 56 to valve 58 which during "charge" mode is connected to product output line 59 and is thereafter recovered.

Still referring to the conventional zero liquid discharge water purification system 50 of FIG. 6, the figure also shows the system being operated in "discharge mode" wherein the discharge stream 44 exiting the supercapacitor desalination unit is directed via valve 58 via pump 60 to precipitation unit 46. Conditions in the precipitation unit are maintained such that the discharge stream is supersaturated in the ionic solute which precipitates in the precipitation unit as solid precipitate 48 which may be collected on a filtration device such as a centrifuge. The liquid phase present in the precipitation unit is directed through fluid return loop 64, valve 52 and fluid input line 54 back to the supercapacitor desalination unit to aid the removal of the ionic solute from the supercapacitor desalination unit. Thus, during "discharge" mode the supercapacitor desalination unit is washed with a solution 42 which is saturated or supersaturated with respect to conditions prevailing in the precipitation unit.

Those skilled in the art will appreciate that when the conventional zero liquid discharge water purification system 50 featured in FIG. 6 is being operated in "charge" mode, the precipitation unit will be idled. In "discharge" mode, the precipitation unit is being operated but under non-steady state conditions. Thus, a conventional zero liquid discharge water purification system is not susceptible to continuous operation with a precipitation unit operating under steady state conditions. Those skilled in the art will understand the desirability of continuous unit operations operating under steady state conditions in order to make effective use of equipment and to exercise a high level of process control.

Figure 7A:
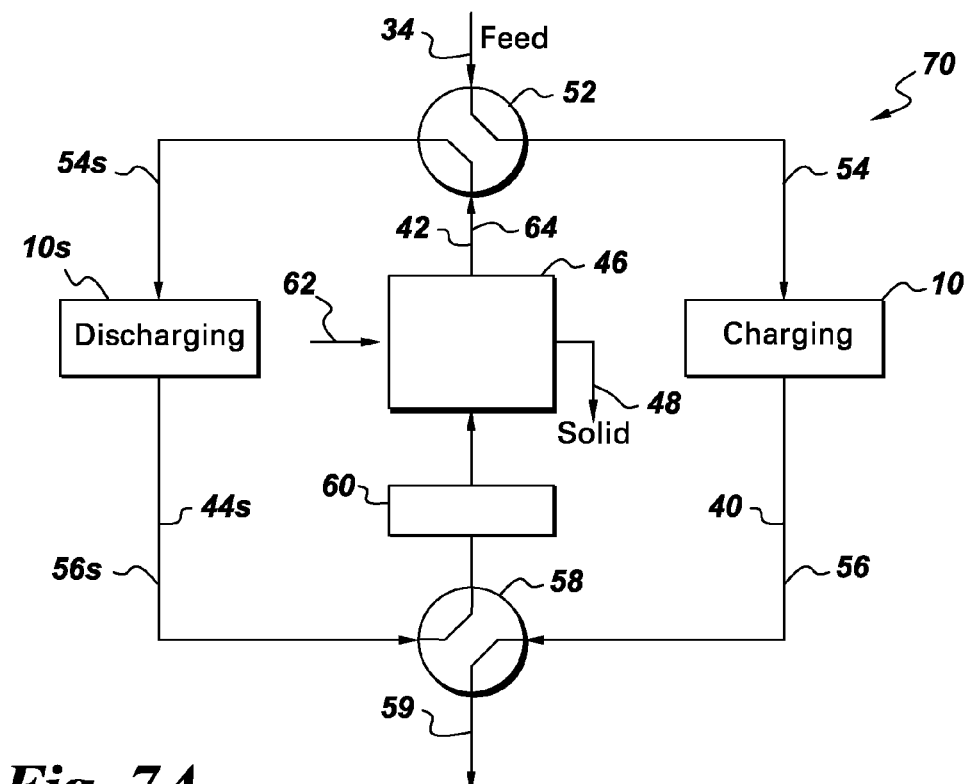
FIG. 7 is a block diagram of a zero liquid discharge water purification system in accordance with embodiments of the present invention.

Referring to FIG. 7, the figure illustrates several embodiments of the present invention. In a first embodiment, FIG. 7 illustrates a zero liquid discharge water purification system 70 which operates simultaneously in "charge" mode and "discharge" mode and comprises a common precipitation unit 46 susceptible to operation under steady state conditions. FIG. 7a shows a zero liquid discharge water purification system of the present invention comprising a first supercapacitor desalination unit 10 and a second supercapacitor desalination unit 10s, a common precipitation unit 46, a first fluid input line 54 and a second fluid input line 54s, a first fluid discharge line 56 and a second fluid discharge line 56s, a product output line 59, a pump 60, an optional makeup feed inlet 62, and a fluid return loop 64. Those skilled in the art will appreciate that the zero liquid discharge water purification system 70 is configured such that the first and second supercapacitor desalination units 10 and 10s can be alternately and mutually exclusively connected to either the product output line 59, or the common precipitation unit 46. This means that during operation, the output of one of the supercapacitor desalination units can be directed to the product output line 59 while the output of the second supercapacitor desalination unit is simultaneously directed to the common precipitation unit 46 via pump 60. Those skilled in the art will further appreciate the advantages presented by the common precipitation unit. Namely, because the common precipitation unit is supplied alternately by first one and then another supercapacitor desalination units operating alternately in "charge" and "discharge" modes, the common precipitation unit may be operated continuously and under steady state conditions.

Still referring to FIG. 7, the figure illustrates a second aspect of the invention, namely a method of purifying an aqueous liquid. Thus FIG. 7a illustrates a method wherein an aqueous feed solution 34 is introduced via valve 52 and fluid input line 54 into a first supercapacitor desalination unit 10 operating in "charge" mode. As the feed solution passes through the supercapacitor desalination cells 16 (See FIG. 3) present in the supercapacitor desalination unit, a portion of the ionic solute present in the feed solution is retained within the cell, with anions being retained on the positively charged electrode (anode) and cations being retained on the negatively charged electrode (cathode) as depicted in FIG. 4. A product stream 40 emerges from supercapacitor desalination unit 10 and is conveyed through fluid discharge line 56 and valve 58 to the product output line 59. The product stream 40 constitutes a purified liquid in the sense that it contains substantially less of the ionic solute than the feed stream 34.

Still referring to FIG. 7, FIG. 7a illustrates the feature of the invention in which a second supercapacitor desalination unit (denoted 10s for convenience and to distinguish it from the first supercapacitor desalination unit 10) is discharged while the first supercapacitor desalination unit 10 is being charged. Those skilled in the art will appreciate that on start-up supercapacitor desalination units 10 and 10s may be charged sequentially so that during operation the supercapacitor desalination units operate out of phase such that while the first supercapacitor desalination unit is charging, the second supercapacitor desalination unit is discharging. As second supercapacitor desalination unit 10s is discharged a concentrated solution comprising the ionic solute (referred to at times as "concentrate B" or discharge stream 44s) emerges from the second supercapacitor desalination unit and is transferred through the second fluid discharge line 56s and valve 58 under a force provided by pump 60. Concentrate B is introduced into common precipitation unit 46. Under the prevailing conditions within the common precipitation unit concentrate B is a supersaturated solution and a portion of the ionic solute precipitates out as solid precipitate 48. The common precipitation unit is equipped with means for continuous removal of the solid precipitate, said means being for example a centrifuge or a rotary vacuum filter, and recovery of a supernatant liquid which is directed back to the second supercapacitor desalination unit 10s through fluid return loop 64, valve 52, and second fluid input line 54s. The supernatant liquid can be re-circulated through supercapacitor desalination unit 10s until the desired level of discharging has been achieved. Those skilled in the art will appreciate that the common precipitation unit may be sized appropriately such that variations in the amount of dissolved solute present in the discharge stream 44s will not adversely affect steady state operation of the common precipitation unit 46 once established.

Figure 7B:
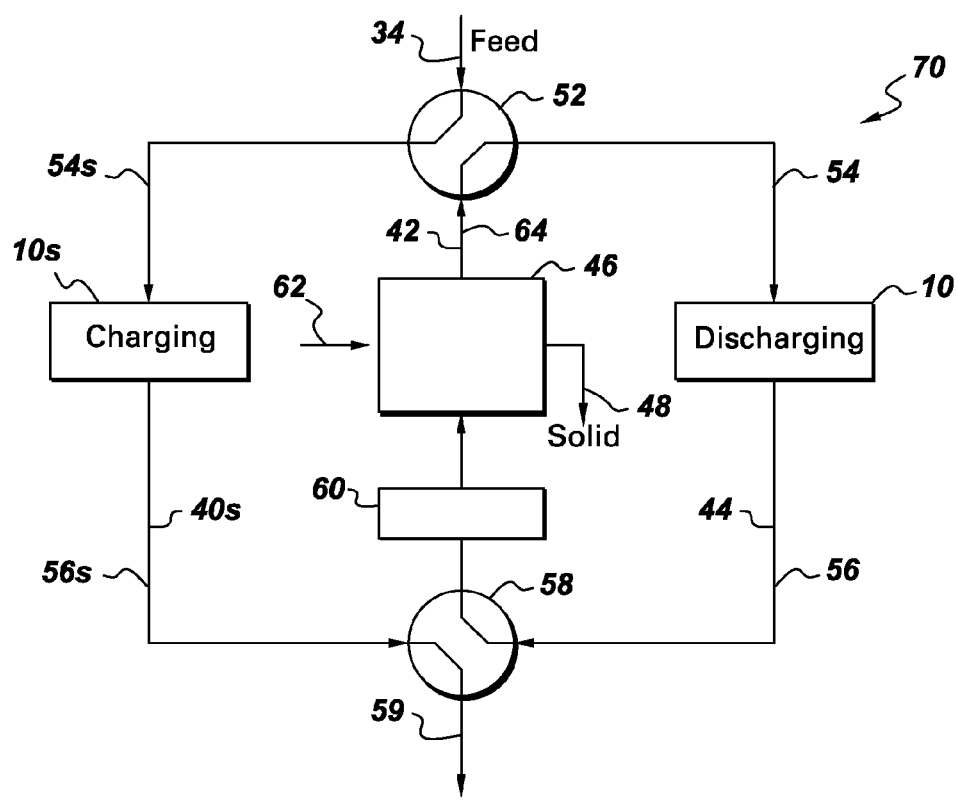

Still referring to FIG. 7, FIG. 7b illustrates the feature of the invention in which the first supercapacitor desalination unit 10 is operated in discharge mode while the second supercapacitor desalination unit 10s is operated in "charge" mode. In the embodiment illustrated in FIG. 7, a supercapacitor desalination unit can be switched from "charge" mode to discharge mode simply by short-circuiting the electrodes within the supercapacitor desalination cells and rotating valves 52 and 58. Alternatively, a supercapacitor desalination unit can be switched from "discharge" mode to "charge" mode simply by applying a voltage potential across the electrodes of the supercapacitor desalination cells and switching valves 52 and 58.

Figure 8A:
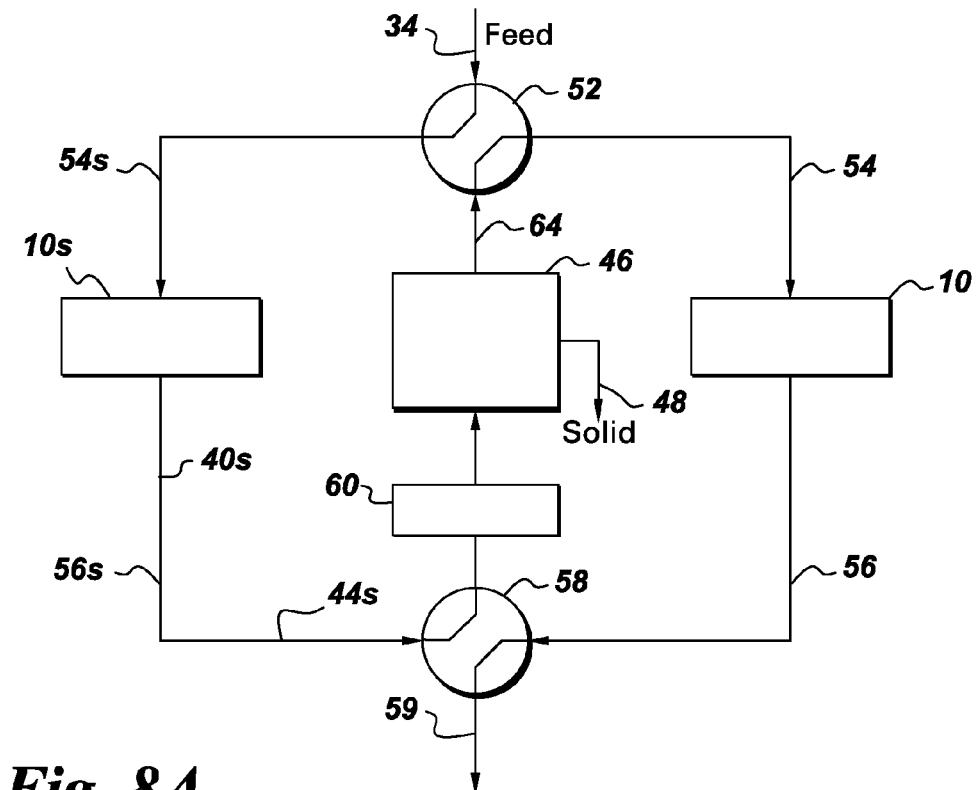
FIG. 8 is a block diagram of a zero liquid discharge water purification system in accordance with embodiments of the present invention.

Referring to FIG. 8, the figure illustrates a protocol that may be used according to the method of the present invention. FIG. 8a represents an intermediate configuration of the zero liquid discharge water purification system 70 useful when switching from the configuration shown in FIG. 7a to the configuration shown in FIG. 7b. This configuration enables flushing of the inventory of both supercapacitor desalination units 10s and 10 and associated piping 56s and 56 in order to capture the value of these inventories and to avoid mixing concentrated and purified streams. This step also enables the feed lines 54s and 54 to be charged with the correct composition in preparation for operation in the mode depicted by FIG. 7b. The duration of operation in the mode shown in FIG. 8a is short relative to the duration of operation in the modes shown in FIGS. 7a and 7b. Those skilled in the art will recognize that the configurations of FIG. 7a and FIG. 8a are related and interchangeable by switching valve 52. Referring to FIG. 8a, feed stream 34 is reintroduced to the second supercapacitor desalination unit 10s to flush the concentrated inventory of cell 10s and line 56s toward the common precipitation unit. This results in line 54s and cell 10s being at least partially filled with fresh feed and thus ready to be placed into the charging mode. This also results in line 54 and cell 10 being at least partially filled with concentrate and thus ready to be placed into the discharging mode. Operation in the mode depicted by FIG. 8a also flushes clean product from supercapacitor desalination unit 10, fluid discharge line 56 and to the product output line 59 via valve 58. When this flushing step is complete, as indicated by either a preset timer or by suitable conductivity or concentration measurements, valve 58 is switched to provide the configuration shown in FIG. 7b.

Figure 8B:
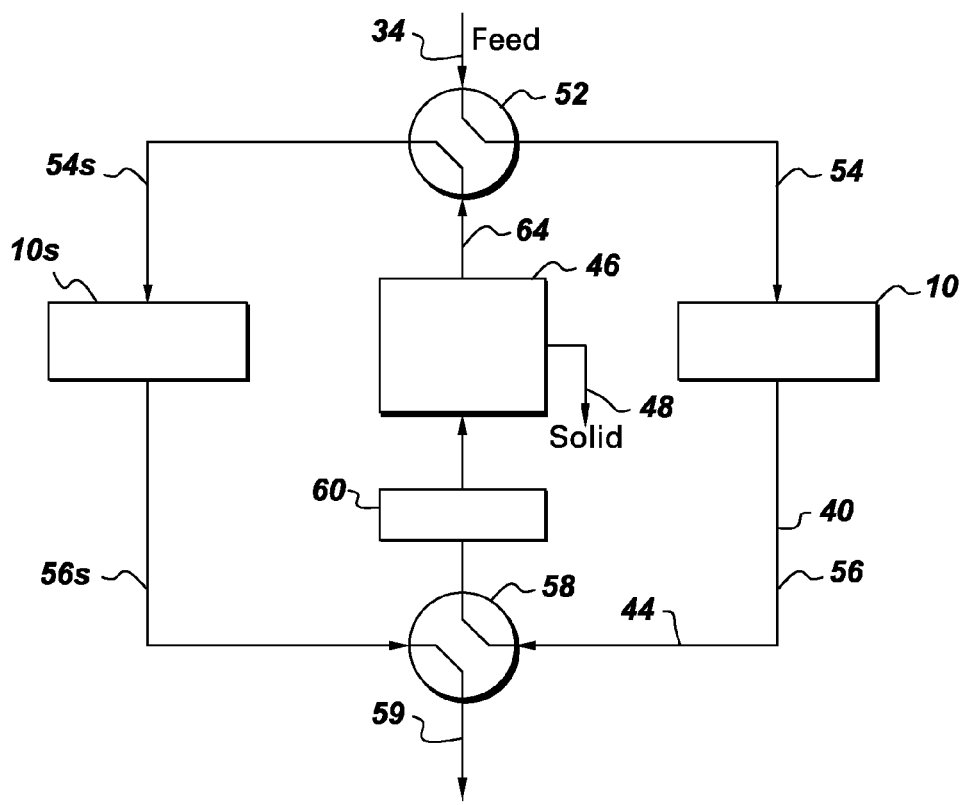

FIG. 8b represents an intermediate configuration of the zero liquid discharge water purification system 70 useful when switching from the configuration shown in FIG. 7b back to the configuration shown in FIG. 7a. Those skilled in the art will recognize that the configurations of FIG. 7b and FIG. 8b are related and interchangeable by switching valve 52. Referring to FIG. 8b, feed stream 34 is reintroduced to the first supercapacitor desalination unit 10 to flush the concentrated inventory of first supercapacitor desalination unit 10 and fluid discharge line 56 toward the common precipitation unit. This results in line 54 and cell 10 being at least partially filled with fresh feed and thus ready to be placed into the charging mode. This also results in line 54s and cell 10s being at least partially filled with concentrate and thus ready to be placed into the discharging mode. Operation in the mode depicted by FIG. 8b also flushes clean product from second supercapacitor desalination unit 10s and fluid discharge line 56s to product output line 59 via valve 58. When this flushing step is complete, as indicated by either a preset timer or by suitable conductivity or concentration measurements, valve 58 is switched to provide the configuration shown in FIG. 7a.

Those skilled in the art will recognize that the common precipitation unit 46 featured in various aspects of the present invention may produce a wet solid, which may optionally be dried in a separate operation such as a thermal crystallizer to enable additional water recovery. Further, the common precipitation unit 46 featured in various aspects of the present invention may comprise a purge stream. The purge stream may also be treated in a thermal crystallizer to enable additional water recovery. To permit substantially steady-state operation of the common precipitation unit, water losses from the precipitator represented by either the purge stream, the moisture content of the solid product, or both, may be made up by introducing a small amount of fresh feed to the precipitator via makeup feed inlet 62.

As noted, in various embodiments of the present invention a method is provided for the purification of an aqueous liquid comprising an ionic solute using a zero liquid discharge water purification system comprising a first supercapacitor desalination unit, a second supercapacitor desalination unit, and a common precipitation unit.

In another embodiment, the present invention provides a zero liquid discharge water purification system useful for the purification of aqueous liquids comprising one or more ionic solutes. The system comprises a first supercapacitor desalination unit, a second supercapacitor desalination unit, a common precipitation unit, a first fluid input line and a second fluid input line, a first fluid discharge line and a second fluid discharge line, a product output line and a fluid return loop. In one embodiment, at least one of the supercapacitor desalination units comprises at least one electrode comprising an aerogel, for example a carbon aerogel having a low electrical resistivity and a high specific surface area. In some embodiments at least one of the supercapacitor desalination units comprises a pair of oppositely charged surfaces which perform the ion retentive function of an electrode. Thus in certain embodiments either the first supercapacitor desalination unit, the second supercapacitor desalination unit or both may comprise at least one pair of oppositely charged surfaces at least one of which surfaces comprises an aerogel. In another embodiment, at least one of the first and second supercapacitor desalination units comprises at least one pair of oppositely charged surfaces comprising an aerogel.

In one embodiment, the present invention provides a zero liquid discharge water purification system comprising a first supercapacitor desalination unit, a second supercapacitor desalination unit, a common precipitation unit, a first fluid input line and a second fluid input line, a first fluid discharge line and a second fluid discharge line, a product output line, and a fluid return loop, wherein the first and second supercapacitor desalination units can be alternately and mutually exclusively connected to either the product output line, or the common precipitation unit. In one embodiment, when the first supercapacitor desalination unit is connected to the common precipitation unit it is also connected to the fluid return loop, and at least a portion of the first fluid input line is connected to the fluid return loop. In one embodiment, the first and second supercapacitor desalination units can be alternately and mutually exclusively connected to either the product output line or the common precipitation unit using no more than two valves. In one embodiment, the zero liquid discharge water purification system further comprises a fluid pump. In another embodiment, the common precipitation unit comprises a makeup feed inlet and a continuous filtration device. In one embodiment, the common precipitation unit comprises a continuous filtration device selected from the group consisting of Bird filters, drum filters, rotary vacuum filters, centrifuges, and combinations thereof. In one embodiment, the zero liquid discharge water purification system provided by the present invention comprises a common precipitation unit comprising a Bird filter.

In one embodiment, the present invention provides a zero liquid discharge water purification system comprising a first supercapacitor desalination unit, a second supercapacitor desalination unit, a common precipitation unit, a first fluid input line and a second fluid input line, a first fluid discharge line, a second fluid discharge line, a product output line, and a fluid return loop, wherein the first and second supercapacitor desalination units can be alternately and mutually exclusively connected to either the product output line, or the common precipitation unit, and wherein at least one of the first supercapacitor desalination unit and second supercapacitor desalination unit comprises an energy recovery device, for example an inverter.

In one embodiment, the present invention provides a zero liquid discharge water purification system comprises at least one pair of oppositely charged surfaces comprising an ion permeable organic coating, for example an ion permeable organic polymer.

As noted, in various embodiments of the present invention use is made of or the system comprises a common precipitation unit which can serve for the continuous removal of a solid precipitate. The common precipitation unit may comprise a continuous filtration apparatus which separates the precipitate from a supernatant liquid. In one embodiment, the common precipitation unit comprises a continuous filtration apparatus selected from the group consisting of Bird filters, drum filters, rotary vacuum filters, centrifuges, and combinations thereof. In an alternate embodiment, the common precipitation unit comprises a continuous filtration apparatus which is a centrifuge. In yet another embodiment, the common precipitation unit comprises a continuous filtration apparatus which is a rotary vacuum filter.

The methods provided by the present invention may be characterized by various residence times of material within certain components of the system used to practice the invention. In one embodiment, the method of the present invention is characterized by a residence time in the common precipitation unit of concentrates A or B in a range from about 1 minute to about 24 hours. In an alternate embodiment, the method of the present invention is characterized by a residence time in the common precipitation unit of concentrates A or B in a range from about 10 minutes to about 4 hours.

In various embodiments the methods provided by the present invention may be characterized by a charge time and a discharge time. The charge time is the time interval that a supercapacitor desalination unit is operated in "charge" mode. The discharge time is the time interval that a supercapacitor desalination unit is operated in "discharge" mode. Although charge times and discharge times may be varied as required during the continuous purification of an aqueous liquid comprising an ionic solute, sequentially related charge and discharge times may be about the same length.

In one embodiment, the method provided by the present invention is characterized by a potential drop of about 1 volt across at least one pair of oppositely charged surfaces. In one embodiment, the method provided by the present invention is characterized by a potential drop of about 1 volt across at least one pair of oppositely charged electrodes in a supercapacitor desalination cell.

As noted, when switching from "charge" mode to "discharge" mode, the electrodes or oppositely charged surfaces of a supercapacitor desalination cell within a charging supercapacitor desalination unit are short-circuited or subjected to a controlled discharge. When the controlled discharge approach is taken, the energy stored in the supercapacitor desalination unit during charging can be recovered. In one embodiment, at least one of the supercapacitor desalination units used in the methods provided by the present invention is subjected to a controlled discharged and energy stored in the supercapacitor desalination unit during charging is recovered with one or more energy recovery devices. In one embodiment, the energy recovery device is an inverter.

In one embodiment, the present invention provides a zero liquid discharge water purification system comprising at least one energy recovery device. In one embodiment, the energy recovery device is an inverter. In one embodiment, the present invention provides a zero liquid discharge water purification system comprising an inverter.

The embodiments described herein are examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A zero liquid discharge water purification system comprising:
    (a) a first fluid input line in fluid communication with a first supercapacitor desalination unit having a first fluid discharge line;
    (b) a second fluid input line in fluid communication with a second supercapacitor desalination unit having a second fluid discharge line;
    (c) the first fluid discharge line and second fluid discharge line alternately and mutually exclusively connectable to a common precipitation unit;
    (d) a product output line alternately and mutually exclusively connectable to either the first fluid discharge line or second fluid discharge line; and
    (e) a fluid return loop connected between the common precipitation unit and alternately and mutually exclusively to either the first fluid input line or second fluid input line;
    wherein the first and second supercapacitor desalination units alternately and mutually exclusively connected to either the product output line through the first fluid input line or second fluid input line, or the common precipitation unit through the first fluid discharge line and second fluid discharge line.

2. The system according to claim 1, wherein when the first supercapacitor desalination unit is connected to the common precipitation unit it is also connected to the fluid return loop, and at least a portion of the first fluid input line is connected to the fluid return loop.

3. The system according to claim 1, wherein when the first supercapacitor desalination unit is connected to the product output line, the second supercapacitor desalination unit is connected to the common precipitation unit and the fluid return loop, and at least a portion of the second fluid input line is connected to the fluid return loop.

4. The system according to claim 1, wherein the first and second supercapacitor desalination units are alternately and mutually exclusively connected to either the product output line or the common precipitation unit using no more than two valves.

5. The system according to claim 1, further comprising a fluid pump.

6. The system according to claim 1, wherein the common precipitation unit comprises a makeup fluid inlet and a continuous filtration device.

* * * * *